US009394812B2

(12) United States Patent
McNelis et al.

(10) Patent No.: US 9,394,812 B2
(45) Date of Patent: Jul. 19, 2016

(54) ATTENUATING ENGINE NOISE USING A REVERSE RESONATOR

(71) Applicant: AAI Corporation, Hunt Valley, MD (US)

(72) Inventors: Niall B. McNelis, Sparks Glencoe, MD (US); Rodney Beach, Littleton, CO (US); Bradley Waltemyer, York, PA (US); Ryan Cardone, Reisterstown, MD (US)

(73) Assignee: AAI Corporation, Hunt Valley, MD (US)

( * ) Notice: Subject to any disclaimer, the term of this patent is extended or adjusted under 35 U.S.C. 154(b) by 0 days.

(21) Appl. No.: 14/327,024

(22) Filed: Jul. 9, 2014

(65) Prior Publication Data

US 2016/0010523 A1 Jan. 14, 2016

(51) Int. Cl.
| | |
|---|---|
| *F01N 1/06* | (2006.01) |
| *F01N 1/14* | (2006.01) |
| *F01N 1/02* | (2006.01) |
| *F01N 3/32* | (2006.01) |
| *F01N 3/34* | (2006.01) |
| *F01N 1/00* | (2006.01) |

(52) U.S. Cl.
CPC *F01N 1/02* (2013.01); *F01N 1/023* (2013.01); *F01N 1/026* (2013.01); *F01N 1/065* (2013.01); *F01N 1/14* (2013.01); *F01N 3/323* (2013.01); *F01N 3/34* (2013.01); *F01N 2270/08* (2013.01)

(58) Field of Classification Search
CPC .............. F01N 1/06; F01N 1/065; F01N 1/14
USPC .................. 181/206, 225, 226; 381/71.5, 71.7
See application file for complete search history.

(56) References Cited

U.S. PATENT DOCUMENTS

| | | | | |
|---|---|---|---|---|
| 3,712,412 A | * | 1/1973 | Hassett | F01N 1/02 181/206 |
| 5,044,464 A | * | 9/1991 | Bremigan | F01N 1/00 181/206 |

(Continued)

FOREIGN PATENT DOCUMENTS

| | | |
|---|---|---|
| AU | 535647 B2 | 3/1984 |
| EP | 0274659 A1 | 7/1988 |

(Continued)

OTHER PUBLICATIONS

International Search Report for International Application No. PCT/US2015/039524 mailed from the International Searching Authority on Oct. 5, 2015, 12 pages.

*Primary Examiner* — Edgardo San Martin
(74) *Attorney, Agent, or Firm* — BainwoodHuang

(57) ABSTRACT

Techniques involve attenuating noise from engine exhaust from an engine. For example, an apparatus includes a first tube having an input end which receives the engine exhaust from the engine, and an output end which outputs the engine exhaust. The apparatus further includes a second tube which encircles the output end of the first tube. The second tube has an exhaust end through which the engine exhaust outputted by the output end of the first tube is allowed to escape, and a resonator end which is opposite the exhaust end. The apparatus further includes a reverse resonator disposed at the resonator end of the second tube. The reverse resonator defines a reverse resonator chamber and a reverse resonator chamber diameter which is larger than a second tube diameter defined by the second tube.

20 Claims, 5 Drawing Sheets

(56) References Cited

U.S. PATENT DOCUMENTS

| | | | | |
|---|---|---|---|---|
| 5,088,575 A * | 2/1992 | Eriksson | F01N 1/065 | 181/206 |
| 5,097,923 A * | 3/1992 | Ziegler | F01N 1/065 | 181/206 |
| 5,229,556 A * | 7/1993 | Geddes | F01N 1/065 | 181/206 |
| 5,336,856 A * | 8/1994 | Krider | F01N 1/065 | 181/206 |
| 5,414,230 A * | 5/1995 | Nieuwendijk | G10K 11/172 | 181/206 |
| 5,446,249 A * | 8/1995 | Goodman | F01N 1/065 | 181/206 |
| 5,466,899 A * | 11/1995 | Geisenberger | F01N 1/065 | 181/206 |
| 5,541,373 A * | 7/1996 | Cheng | F01N 1/065 | 181/206 |
| 5,550,334 A * | 8/1996 | Langley | F16L 55/0333 | 181/206 |
| 5,619,020 A * | 4/1997 | Jones | F01N 1/065 | 181/206 |
| 5,677,958 A * | 10/1997 | Lehringer | F01N 1/065 | 181/206 |
| 5,693,918 A * | 12/1997 | Bremigan | F01B 1/065 | 181/206 |
| 5,828,759 A * | 10/1998 | Everingham | G10K 11/1788 | 181/206 |
| 6,758,304 B1 * | 7/2004 | McLean | F02M 35/125 | 123/184.57 |
| 8,708,094 B2 * | 4/2014 | Neumann | F01N 13/08 | 181/206 |
| 9,025,786 B2 * | 5/2015 | Luecking | F01N 1/065 | 381/56 |
| 2001/0021258 A1 * | 9/2001 | Nagel | F01N 1/065 | 381/71.4 |
| 2006/0027420 A1 * | 2/2006 | Hahnl | F01N 1/165 | 181/283 |
| 2011/0000734 A1 | 1/2011 | Kruger et al. | | |

FOREIGN PATENT DOCUMENTS

| | | | |
|---|---|---|---|
| FR | 1347893 A | | 1/1964 |
| JP | 05098927 A | * | 4/1993 |
| JP | 06058123 A | * | 3/1994 |
| JP | 06058129 A | * | 3/1994 |

* cited by examiner

ATTENUATING ENGINE NOISE USING A REVERSE RESONATOR

BACKGROUND

An automobile muffler is a device which lessens the amount of noise emitted by the exhaust of an automobile engine. During operation, the automobile muffler reflects sound waves produced by the automobile engine. These reflected sound waves then cancel out new sound waves generated by the automobile engine in a process known as destructive interference.

One conventional active muffler includes two adjacent (i.e., side-by-side) pipe outlets: a first pipe outlet carrying engine exhaust noise, and a second pipe outlet which is connected to an active secondary noise source. During operation, the active secondary noise source provides active noise cancellation to interfere destructively with the engine exhaust noise.

SUMMARY

Unfortunately, there are deficiencies to the above-described conventional approaches to reducing engine noise. For example, conventional automobile mufflers do not have reverse cavity resonator configurations even though it has been identified by the authors of the current disclosure that reverse cavity resonation can provide significant noise cancellation effects in both passive and active arrangements. Likewise, the above-identified active muffler which includes two adjacent pipe outlets does not have a reverse cavity resonator configuration and, due to the adjacent outlet configuration, the active muffler further suffers from directional biasing rather than uniform noise cancellation.

In contrast to the above described conventional approaches to reducing engine noise, improved techniques are directed to attenuating noise from an engine using a reverse resonator to introduce an anti-noise signal uniformly around the engine exhaust. Such techniques may passively or actively generate a noise cancellation effect in a mixing volume which encircles the exhaust output. For example, in an active reverse resonantor arrangement, a fan and a speaker disposed behind the exhaust output is able to deliver coaxially oriented airflow with an embedded anti-noise signal to effectively attenuate noise in the engine exhaust.

One embodiment is directed to an apparatus to attenuate noise from engine exhaust from an engine. The apparatus includes a first tube having an input end which receives the engine exhaust from the engine, and an output end which outputs the engine exhaust. The apparatus further includes a second tube which encircles the output end of the first tube. The second tube has an exhaust end through which the engine exhaust outputted by the output end of the first tube is allowed to escape, and a resonator end which is opposite the exhaust end. The apparatus further includes a reverse resonator disposed at the resonator end of the second tube. The reverse resonator defines a reverse resonator chamber and a reverse resonator chamber diameter which is larger than a second tube diameter defined by the second tube.

In some arrangements, the reverse resonator, the output end of the first tube, and the exhaust end of the second tube are arranged in an inline configuration to provide uniform attenuation of the noise from the engine exhaust as the engine exhaust is outputted by the output end of the first tube. Here, the coaxial arrangement of these components provides consistent noise cancellation in each radial direction from the output end of the first tube as the engine exhaust escapes from the output end of the first tube.

In some arrangements, the output end of the first tube defines a first tube diameter, the first tube diameter being smaller than the second tube diameter, and being smaller than the reverse resonator chamber diameter. Such an arrangement allows for coaxial flow from the reverse resonator chamber to the output end of the first tube.

In some arrangements, the output end of the first tube and a portion of the first tube adjacent the output end defines a first tube center axis. Here, the exhaust end and the resonator end of the second tube define a second tube center axis which is coaxial with the first tube center axis. Additionally, the reverse resonator further defines a reverse resonator chamber center axis which is coaxial (or concentric) with the first tube center axis and the second tube center axis.

In some arrangements, the reverse resonator is constructed and arranged to operate in a passive manner to attenuate the noise from the engine exhaust. Such arrangements are simple yet effective.

In other arrangements, the reverse resonator is constructed and arranged to operate in an active manner to attenuate the noise from the engine exhaust. Such arrangements are able to provide enhanced noise cancellation effects which are superior to passive arrangements.

In some arrangements, the reverse resonator includes a speaker to generate an anti-noise signal to cancel the noise from the engine exhaust. Along these lines, the speaker of the reverse resonator can include a diaphragm having a center which is coaxial (or concentric) with (i) the output end of the first tube, (ii) the exhaust end and the resonator end of the second tube, and (iii) the reverse resonator chamber.

In some arrangements, the reverse resonator further includes a fan to provide airflow in a direction from the resonator end of the second tube to the exhaust end of the second tube. For example, the diaphragm of the speaker of the reverse resonator can be disposed between the fan of the reverse resonator and the resonator end of the second tube. Here, the diaphragm of the speaker of the reverse resonator defines a set of apertures which permits the airflow provided by the fan to flow from the fan to the resonator end of the second tube.

In some arrangements, the apparatus further includes an engine exhaust flow sensor which is constructed and arranged to measure a flow velocity of the engine exhaust (e.g., a tachometer to measure rotations per minute, or RPMs, of the engine), and digital signal processing (DSP) circuitry coupled to the engine exhaust flow sensor and to the speaker. In these arrangements, the DSP circuitry is constructed and arranged to provide, based on an engine exhaust flow sensor signal from the engine exhaust flow sensor, an electronic speaker signal to the speaker to embed an acoustic anti-noise signal into the airflow provided by the fan to induce a noise cancellation effect as the airflow provided by the fan mixes with the engine exhaust outputted by the output end of the first tube.

In some arrangements, the apparatus further includes a mixing volume sensor physically coupled to the second tube and electrically coupled to the DSP circuitry to provide an electronic feedback signal (e.g., an error signal) to the DSP circuitry to enable the DSP circuitry to generate the electronic speaker signal based on (i) the electronic feedback signal and (ii) the engine exhaust flow sensor signal.

In some arrangements, the apparatus further includes a fan controller coupled to the engine exhaust flow sensor and to the fan. The fan controller is constructed and arranged to set a flow velocity of the airflow provided by the fan to optimize the noise cancellation effect.

In some arrangements, the apparatus further includes insulation to impede heat transfer from the engine and from the second tube toward the speaker. Such insulation is intended to protect the speaker from sustaining heat damage from the heat generated by the engine. For example, if the first tube is in thermal communication with the engine's exhaust pipe, such insulation can thermally isolate the reverse resonator from the first tube. Additionally, such insulation can form a thermal blanket around the first tube. Furthermore, the inner surface of the second tube can be lined with ceramic thermal insulation. Moreover, the diaphragm of the speaker can be protected with an insulating coating or membrane (e.g., Kevlar®, other synthetic materials, heat-reflecting materials, etc.), and so on.

In some arrangements, the apparatus further includes a reducer coupled to the exhaust end of the second tube. The reducer defines a funnel-shaped pathway (or taper) which is designed to avoid adding air backflow around the output end of the first tube. Rather, the flow is channeled to a narrow outlet of the reducer for further downstream processing or to the ambient surroundings.

Another embodiment is directed to a vehicle which includes a vehicle frame, and an engine coupled to the vehicle frame. The engine is constructed and arranged to provide propulsion to the vehicle frame. The vehicle further includes a noise canceling apparatus as described above which is coupled to the vehicle frame.

Yet another embodiment is directed to a method of attenuating noise from engine exhaust from an engine. The method includes connecting, to the engine, an active noise canceling apparatus having a speaker as described above. The method further includes operating the engine, the engine exhaust from the engine being provided to the input end of the first tube of the above-described apparatus in response to operation of the engine. The method further includes operating the speaker to generate an acoustic anti-noise signal in an airflow in a direction from the resonator end of the second tube to the exhaust end of the second tube to uniformly attenuate the noise from the engine exhaust as the engine exhaust is outputted by the output end of the first tube.

Other embodiments are directed to electronic systems and apparatus, processing circuits, computer program products, and so on. Some embodiments are directed to various methods, mechanical, electronic and electro-mechanical components and circuitry which are involved in attenuating noise from an engine.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to attenuating noise from an engine using a reverse resonator to provide noise cancellation uniformly around an engine exhaust. Such a technique may passively or actively generate a noise cancellation effect in a mixing volume which encircles the exhaust output. For instance, in an active arrangement, a reverse resonator is disposed behind the exhaust output and defines a chamber containing a fan and a speaker. The fan and speaker operate to deliver coaxially oriented airflow with an embedded anti-noise signal to effectively and uniformly attenuate noise in the engine exhaust.

Figure 1:
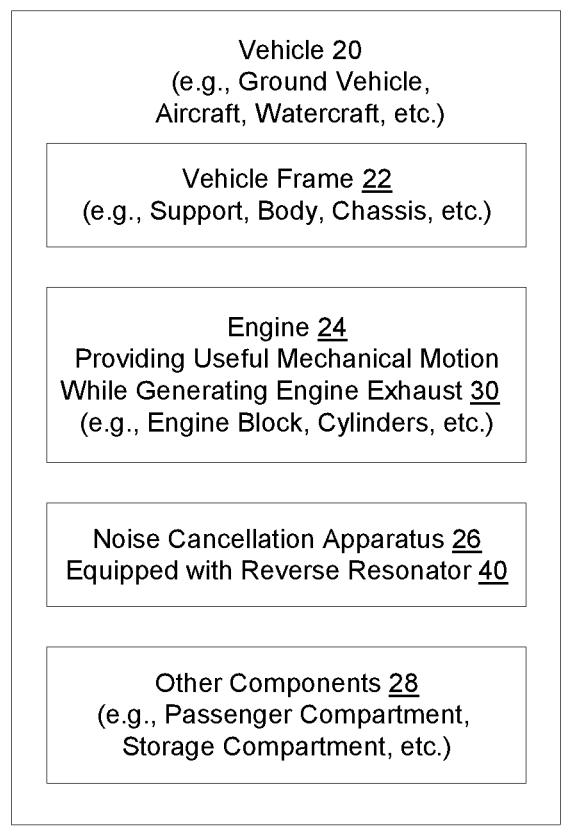
FIG. 1 is a block diagram of a vehicle which is provisioned with a noise canceling apparatus having a reverse resonator.

FIG. 1 is a block diagram of a vehicle 20 which is provisioned with a noise canceling apparatus having a reverse resonator. The vehicle 20 includes a vehicle frame 22, an engine 24, a noise cancellation apparatus 26, and other components 28.

The vehicle frame 22 provides structural support for the various other portions of the vehicle 20 such as a vehicle propulsion subsystem, a fuel delivery subsystem, a vehicle navigation/steering subsystem, and so on. The vehicle frame 22 may take the form of a support or base, a body, a chassis, etc.

The engine 24 provides mechanical motion (e.g., to propel the vehicle 20, to generate electricity, etc.) while generating engine exhaust 30. To this end, the engine 24 may include an engine block (or body section), a set of cylinders, and so on.

The noise cancellation apparatus 26 attenuates noise from the engine 24. In particular, the noise cancellation apparatus 26 is equipped with a reverse resonator 40 which coaxially embeds a noise cancellation signal into the engine exhaust flow to provide a uniform noise cancellation effect. In some arrangements, the reverse resonator 40 defines a chamber which conditions and reflects noise signals back into the engine exhaust 30 to reduce noise in the engine exhaust 30 (i.e., destructive interference). In other arrangements, the reverse resonator defines a chamber as well as includes hardware (e.g., a speaker, a fan, etc.) which actively generates a noise cancellation signal which, when introduced into the engine exhaust flow, provides a robust and reliable noise cancellation effect.

The other components 28 represent other portions of the vehicle 20. For example, in the context of a ground vehicle such as an automobile, a motorcycle, a truck or trailer, a tank or other military vehicle, etc., the other components 28 may include a passenger compartment or section, a storage compartment, specialized equipment, and so on. It should be understood that the other types of vehicles are suitable for use as well such as aircraft (e.g., planes, helicopters, unmanned vehicles or drones, projectiles, etc.), watercraft (e.g., boats, submarines, etc.), combinations thereof, and so on.

During operation, the engine 24 combusts fuel to create mechanical motion and perform useful work. Additionally, the noise cancellation apparatus 26 processes the engine exhaust 30 from the engine combustion to attenuate noise from the engine exhaust 30. Further details will now be provided with reference to FIG. 2.

Figure 2:
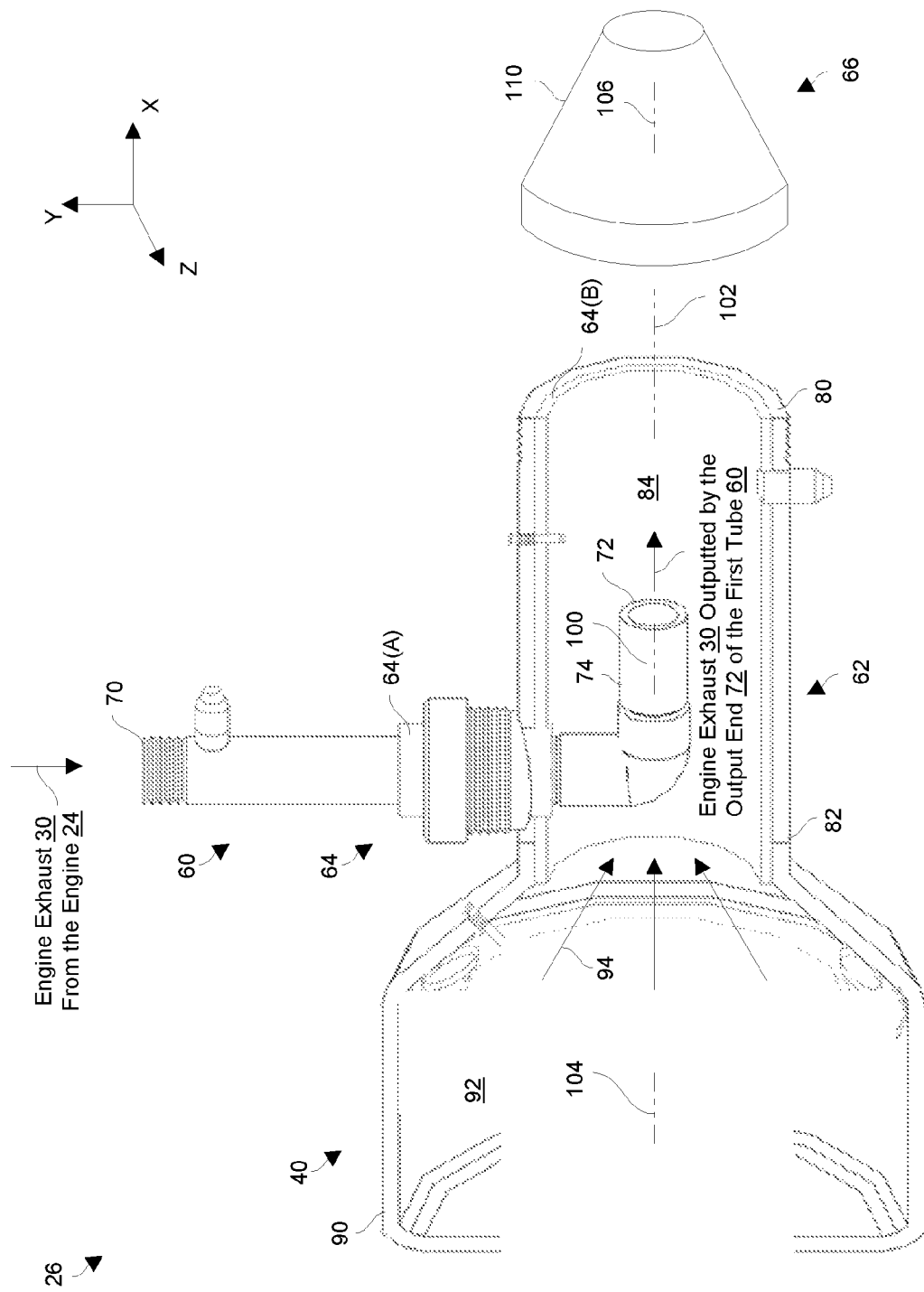
FIG. 2 is a cross-sectional view of the noise canceling apparatus in a passive arrangement.

FIG. 2 shows a cross-sectional side view of a passive configuration of the noise canceling apparatus 26. As shown, the noise canceling apparatus 26 includes a first tube 60, a second tube 62, a reverse resonator 40, insulation 64, and a reducer 66.

The first tube 60 has an input end (or opening) 70 which receives the engine exhaust 30 from the engine 24 in the negative Y-direction. Additionally, the first tube 60 has an output end 72 which outputs the engine exhaust 30 in the positive X-direction and an end section 74. In some arrangements, the input end 70 of the first tube 60 is adapted to conveniently engage with the exhaust pipe or exhaust manifold of the engine 24. For example, the input end 70 can be configured to directly mate with or couple to the engine's exhaust pipe.

The second tube 62 encircles the output end 72 of the first tube 60, e.g., surrounds the output end 72 (360 degrees) in the Y-Z plane and extends in both directions along the X-axis. As shown, the second tube 62 has an exhaust end 80 through which the engine exhaust 30 outputted by the output end 72 of the first tube 60 is allowed to escape, and a resonator end 82 which is opposite the exhaust end 82. The space 84 defined by the second tube 62 immediately adjacent the output end 72 of the first tube 60 is considered a mixing volume region which will be explained in further detail shortly.

The reverse resonator 40 couples to the resonator end 82 of the second tube 62. The reverse resonator 40 includes a reverse resonator housing (or casing) 90 which defines a reverse resonator chamber 92. In the passive configuration of FIG. 2, the reverse resonator chamber 90 is hollow to enable the housing 90 to gather and focus sounds waves from the engine exhaust 30 to generate a set of anti-noise signals 94. In particular, the primary opening of the housing 90 leads to the reverse resonator end 82 of the second tube 62.

The insulation 64 is constructed, arranged and located to impede heat flow and heat collection from the engine 24 and from the engine exhaust 30 within the reverse resonator 40. Such insulation 64 includes an insulation layer 64(A) which thermally separates the first tube 60 and the second tube 62. Such insulation 64 further includes a layer 64(B) (e.g., a ceramic coating or lining) which thermally shields the second tube 62 from the engine exhaust 30. Other forms and layers of insulation 64 are suitable for use as well.

At this point, particular geometric aspects of the noise canceling apparatus 26 will be provided. Along these lines, it should be understood that the various components of the noise canceling apparatus 26 have particular diameter requirements (as measured perpendicularly from the X-axis). In particular, the diameter of the output end 72 of the first tube 60 is narrower than the diameter of the second tube 62. Additionally, the diameter of the second tube 62 is narrower than the diameter of the reverse resonator chamber 40.

Moreover, it should be understood that the various components of the noise canceling apparatus 26 have particular orientation requirements (e.g., axial alignments). In particular, the output end 72 and the end section 74 of the first tube 60 define a center axis 100 along which the engine exhaust 30 exits (i.e., along the positive X-direction). Additionally, the second tube 62 defines a center axis 102 which is co-linear with the center axis 100, i.e., the end second 74 of the first tube 60 and the second tube 62 are coaxial. Likewise, the housing 90 of the reverse resonator 40 defines a center axis 104, and the reducer 66 defines a center axis 106, and both center axes 104, 106 are co-linear with the center axes 100, 102. It should thus be appreciated that a coaxial relationship exists among these components.

During operation, the input end 70 of the first tube 60 receives the engine exhaust 30 from the engine 24, and the output end 72 of the first tube outputs the engine exhaust 30 into the mixing volume 84. Noise from the engine exhaust 30 reflects back from the reverse resonator 40 as the set of anti-noise signals 94 (see FIG. 2). In particular, the set of anti-noise signals 94 flows around the output end 72 of the first tube 60 and combines within the mixing volume 84 with the noise from the engine exhaust 30. Such coaxial oriented delivery of airflow with an embedded anti-noise signal uniformly attenuates noise in the engine exhaust 30 to provide an advantageous noise cancellation effect.

It should be understood that the engine exhaust 30 continues to flow in the positive X-direction through the reducer 66 for further processing (e.g., by a catalytic converter, by an energy conservation stage, etc.) or into the ambient surroundings. The reducer 66 defines a funnel-shape or taper 110 which is designed to avoid introduction of backflow in the negative X-direction. Rather, the engine exhaust 30 flows robustly and reliably in the positive X-direction for efficient and optimal engine operation. Further details will now be provided with reference to FIGS. 3 and 4.

Figure 3:
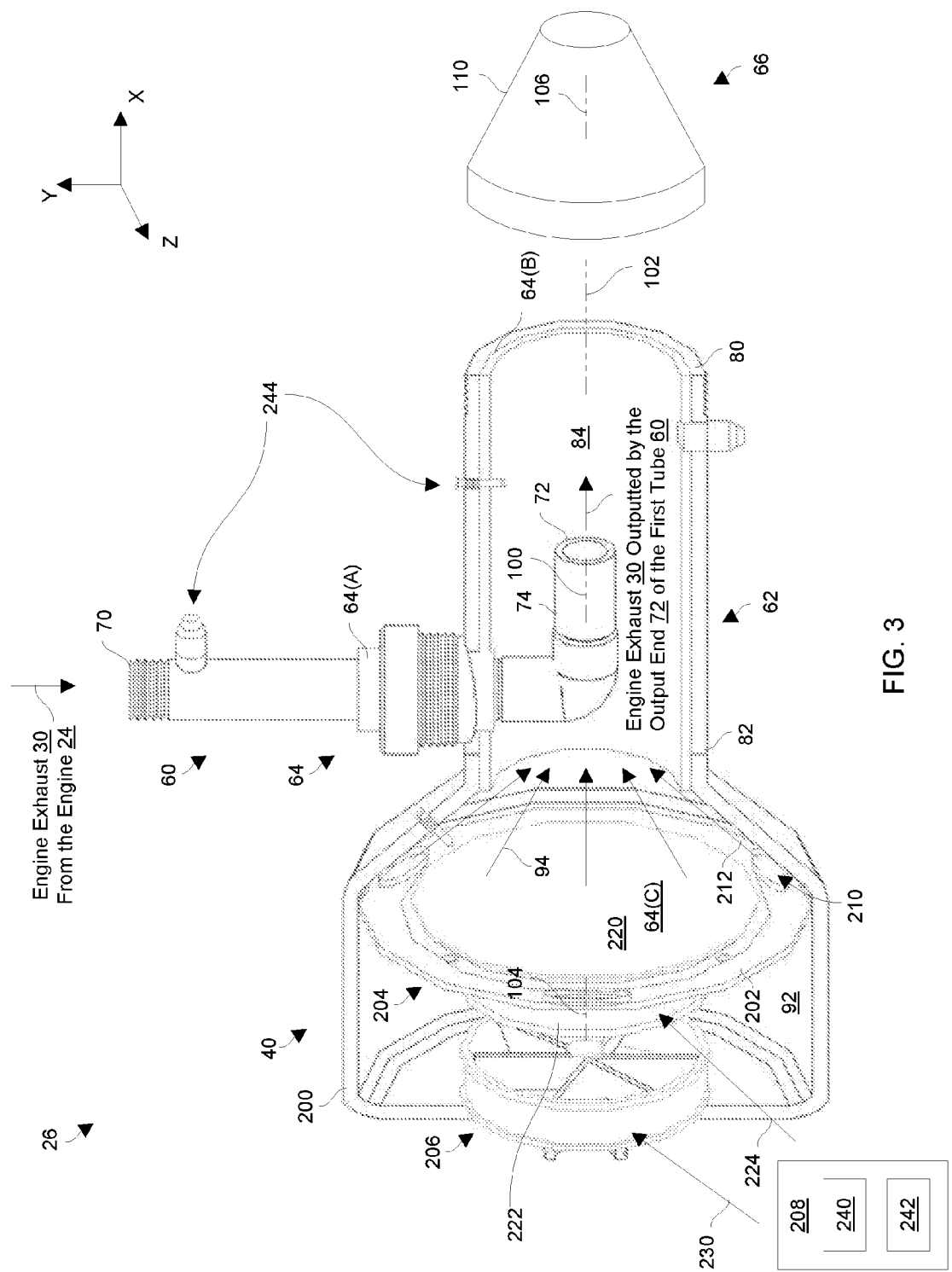
FIG. 3 is a cross-sectional view of the noise canceling apparatus in an active arrangement.
Figure 4:
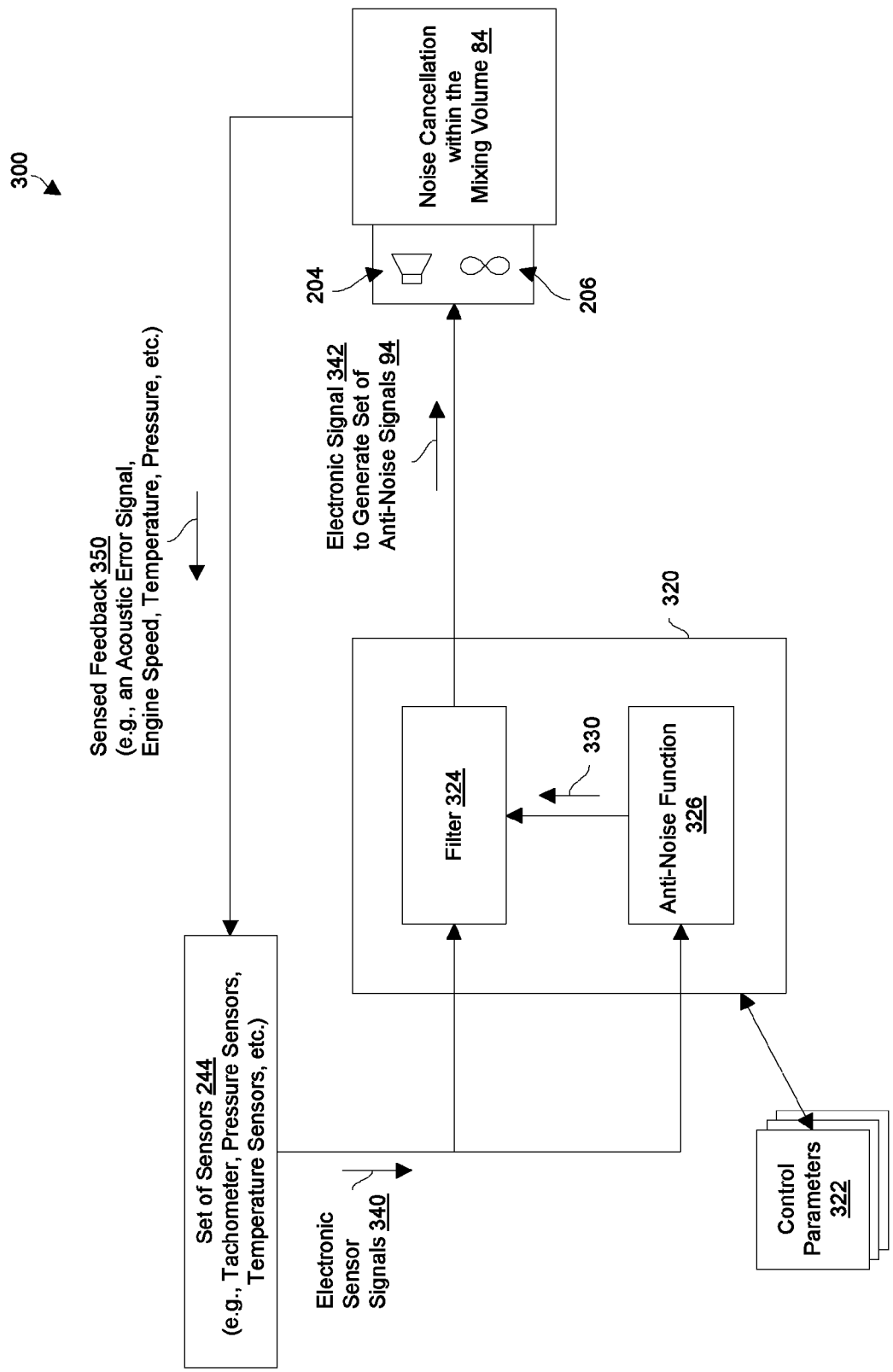
FIG. 4 is a block diagram of particular details of the active arrangement of FIG. 3.

FIGS. 3 and 4 provide details of an active configuration of the noise canceling apparatus 26. FIG. 3 shows a cross-sectional side view of an active configuration of the noise canceling apparatus 26. FIG. 4 shows particular circuitry details of the active configuration of the noise canceling apparatus 26. In this arrangement, the various components of the noise canceling apparatus 26 are similar to that of the passive configuration, and similar components are provided with the same reference numbers. However, the reverse resonator 40 is constructed and arranged to actively generate the set of anti-noise signals 94 which cancels noise from the engine 24.

As shown in FIG. 3, the reverse resonator 40 of the active configuration includes a reverse resonator housing 200, a speaker mounting ring 202, a speaker 204, a fan 206, and control circuitry 208. Recall that, in the passive configuration (FIG. 2), the reverse resonator housing 90 of the active configuration is constructed and arranged to define a substantially empty reverse resonator chamber 92. In contrast, the speaker mounting ring 202, the speaker 204, and the fan 206 are disposed within the reverse resonator chamber 200 and provide the set of anti-noise signals 94 to the second tube 62 (FIG. 3).

The speaker mounting ring 202 fastens the speaker 204 to the housing 200. Additionally, the speaker mounting ring 202 defines apertures 210 which allows an airstream 212 to flow from one side of the speaker 204 to the other toward the second tube 62.

The speaker 204 includes a diaphragm 220 which resides substantially in the Y-Z plane, and speaker hardware 222 which is constructed and arranged to vibrate the diaphragm 222 in response to electronic signals 224 from the control circuitry 208 to produce the set of anti-noise signals 94. In some arrangements, the diaphragm 220 is protected (e.g., coated) with insulation 64(C) to protect the diaphragm 220 against excessive heat from the engine 24 and the engine exhaust 30.

The fan 206 is constructed and arranged to provide the airstream 212 which flows from the back to the front of the reverse resonator chamber 92 and toward the second tube 62, i.e., in the positive X-direction. The fan 206 is capable of varying the speed of the airstream 212 in response to electronic signals 230 from the control circuitry 208.

It should be understood that the fan 206 has access to an air source. In some arrangements, the fan 206 has access to relatively cool ambient air to enable the airstream 212 to not only facilitate mixing of the airstream 212 with the engine exhaust 30 in the mixing volume 84, but also to concurrently provide cooling to the speaker 204.

The control circuitry 208 includes speaker control circuitry 240, fan control circuitry 242, and a set of sensors 244. The speaker control circuitry 240 is constructed and arranged to provide the electronic signals 224 to control the speaker 202 (i.e., to generate anti-noise signals 94). The fan control circuitry 242 is constructed and arranged to provide the electronic signals 230 to control the fan 206 (to set the fan speed). The set of sensors 244 (e.g., an engine exhaust flow sensor, a mixing volume sensor, etc.) provides electronic input to the control circuitry 208 to enable proper operation.

By way of example and as shown in FIG. 4, a portion 300 of the control circuitry 208 operates to generate a set of electronic signals 310 which is fed to the speaker 204 and the fan 206 to generate the set of anti-noise signals 94 (also see FIG. 3). The portion 300 of control circuitry 208 includes digital signal processing (DSP) circuitry 320 and control parameters 322 (e.g., predefined settings, tables stored in computerized memory, etc.) which are accessible to the DSP circuitry 320.

It should be understood that the control parameters 322 can be stored in non-volatile computerized memory (e.g., flash memory) for reliable access. In some arrangements, the control parameters 322 are derived during initial design characterization, and the control parameters 322 are then pre-installed onto the noise cancellation apparatus 26. In other arrangements, the control parameters 322 are determined dynamically and custom for each individual noise cancellation apparatus 26. In yet other arrangements, the control parameters 322 are preloaded into the noise cancellation apparatus 26 and then updated during the course of operation.

The digital signal processing circuitry 320 includes filter circuitry 324 and anti-noise function circuitry 326. The filter circuitry 324 performs a variety of filtering operations including low pass filtering to prevent aliasing, and high pass filtering to prevent runaway. The anti-noise circuitry 326 applies a set of anti-noise canceling algorithms (e.g., the filtered-X LMS or FxLMS algorithm) to generate input 330 to the filter circuitry 324.

During operation, the set of sensors 244 takes measurements from various locations of the noise cancellation apparatus 26, the engine 24, and/or other portions of the vehicle 20 (also see FIG. 3). Such measurements are fed as sensed input 340 (i.e., electronic sensor signals) to the DSP circuitry 320. The DSP circuitry 320 accesses the control parameters 322 and, based on the sensed input 340 and the control parameters 322, outputs the set of electronic signal 342 which is fed to the speaker 204 and to the fan 206 to provide the set of anti-noise signals 94 (FIG. 3). In particular, such operation enables the speaker 204 to embed an acoustic anti-noise signal into the airstream 212 provided by the fan 206 to induce a noise cancellation effect as the airstream 212 provided by the fan 206 uniformly mixes with the engine exhaust 30 outputted by the output end 72 of the first tube 60 (e.g., 360 degree mixing, also see FIG. 3).

It should be understood that the sensors 244 can be located anywhere on the vehicle 20 such as on the vehicle frame 22, on the engine 24, on the noise canceling apparatus 26, and so on. For example, a tachometer on the engine 24 is capable of indicating engine speed (i.e., RPMs). Additionally, pressure and temperate sensors mounted to various locations of the noise cancellation apparatus 26 are capable of identifying operating conditions at the point of providing noise cancellation. As a result, the set of sensors 244 is capable of robustly and reliably obtaining sensed feedback 350 (e.g., an acoustic error signal, engine speed, temperature, pressure, etc.). In some arrangements, the fan speed is constantly adjusted to match the airstream 212 to the engine exhaust 30 and thus optimize the noise cancellation effect (FIG. 3). Further details will now be provided with reference to FIG. 5.

Figure 5:
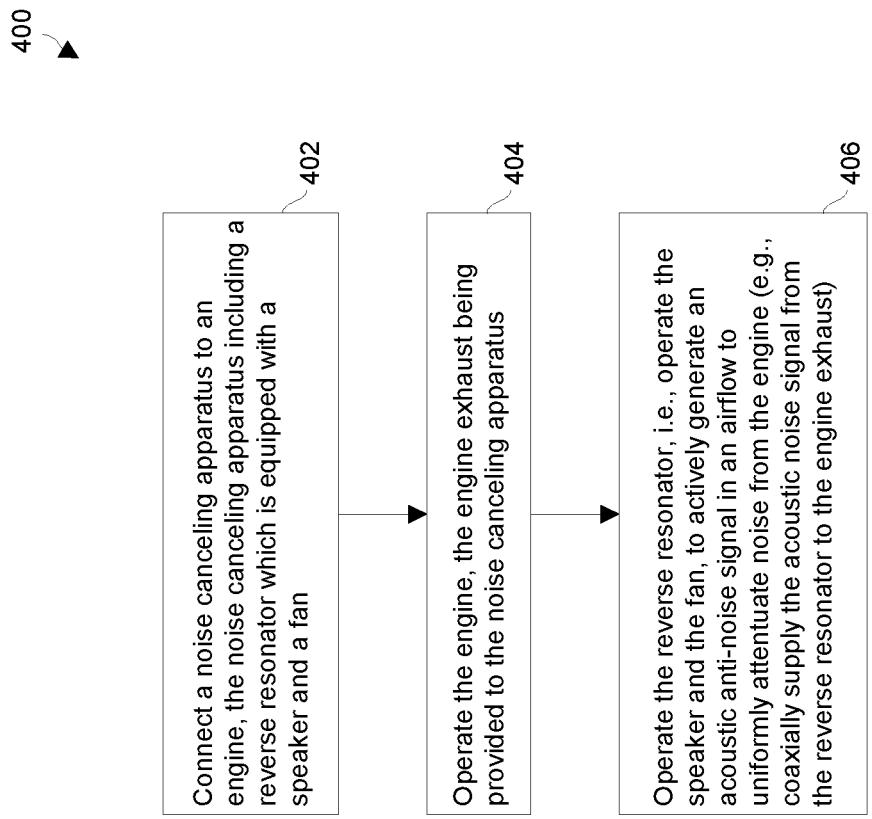
FIG. 5 is a flowchart of a procedure which is performed to provide noise cancellation using a reverse resonator.

FIG. 5 is a flowchart of a procedure 400 which is performed by a user (e.g., a human, a manufacturer, an operator or owner of a vehicle 20, etc.) to attenuate noise from engine exhaust 30 from an engine 24. At 402, the user connects the noise canceling apparatus 26 to the engine 24. Recall that the reverse resonator 40 of the noise canceling apparatus 26 has a speaker 204 and a fan 206 which are coaxially aligned with an output end 72 that allows the engine exhaust 30 to escape (also see FIG. 3).

At 404, the user operates the engine 24. Accordingly, the engine exhaust 30 from the engine 24 is provided to the input end 70 of the first tube 60 of the noise canceling apparatus 26 in response to operation of the engine 24 (FIG. 3).

At 406, the user operates the speaker 204 and the fan 206 to generate a set of acoustic anti-noise signals 94 in an airstream 212 to uniformly attenuate the noise from the engine exhaust 30 in a coaxial manner as the engine exhaust 30 exits the opening 72. In particular, the set of acoustic anti-noise signals 94 cause a noise cancellation effect to reduce noise from the engine exhaust 30 from the engine 24.

As described above, improved techniques are directed to attenuating noise from an engine 24 using a reverse resonator 40 to introduce a set of anti-noise signals 94 uniformly around the engine exhaust 30. Such techniques may passively or actively generate a noise cancellation effect in a mixing volume which encircles the exhaust output 72. For example, in an active reverse resonator arrangement, a fan 206 and a speaker 204 disposed behind the exhaust output 72 is able to supply coaxially oriented airstream 212 with embedded anti-noise signals 94 to effectively attenuate noise in the engine exhaust 30.

Based on the above-provided description, it should be appreciated that the pressure variations that constitute the exhaust sound heard at the exhaust port of an engine are typically embedded in this flowing medium. The noise cancelling apparatus 26 described herein provides at least two key features that facilitate the embedding of anti-noise signals 94 into that flow as well: (i) coaxial flow of the anti-noise signals 94 produced by the speaker 204 around the exhaust opening 72 and then down into the mixing volume 84 (FIG. 3), and (ii) introduction of a flow medium 212 produced by the fan 206 that induces the air flow around the speaker 204 and into the coaxial flow.

It should be further appreciated that the flow velocity can be set by a variable fan speed governed by tachometer output (e.g., engine rotational speed). Additionally, it should be understood that the speaker 204 can be replaced by any type of air flow modulator that can embed the required canceling frequencies into the air flow.

Furthermore, it should be understood that the speaker 204 is not only cooled by the fan 206, but that the speaker 204 is also cooled by the housing 200 (FIG. 3), i.e., heat dissipation. For example, the housing 200 may take the form of a metal case that houses the speaker 204. Also the earlier described thermal isolation techniques isolate the speaker 204 from contact with the exhaust tube 60. Along these lines, the exhaust tube 60 can be wrapped in a thermal blanket to prevent radiant heat from entering the mixing volume 84 or the surrounding second tube 62. Additionally, the outer second tube 62 can be lined with a ceramic thermal insulation to limit heat flow from the hot exhaust gas to the metal casing. The speaker face can be further protected from the toxic gas and residual heat by a heat resistant or heat reflective membrane.

It should be further understood that there are three electrical/mechanical/acoustic paths which can have their transfer functions characterized for the controlling algorithm: the primary path, the secondary path, and the feedback path. The secondary path and the feedback path can be characterized offline. The secondary transfer function can be calculated at different fan flow velocities. The primary path can be characterized during normal operation.

The operating algorithm can be a modified FxLMS noise canceling algorithm that is adapted to compensate for temperature and flow variations. The operating algorithm may use a tachometer input, a primary exhaust pressure pickup (or sensor), and a mixing volume error pressure pickup.

After field tests provide configuration optimization, the shell and piping can be manufactured for strength, durability, and weight. A commercialized kit can include the above-described noise cancellation apparatus 26, a circuit board assembly, enclosure, and cabling. The circuit board assembly can include a DSP module, circuitry for tachometer signal conditioning, temperature thermal couple control, fan control, and pressure sensor control.

One should appreciate that such techniques are not only effective with active cancellation of engine exhaust noise (e.g., more effective at lower frequencies) but also in extremely effective passive cancellation of higher frequencies. Such is due to the reverse resonator geometry which places a resonator cavity around and behind the exhaust flow. A reduction coupler (e.g., see the reducer 66 in FIGS. 2 and 3) can be placed at the exit end to reduce the flow back down to the diameter of the engine exhaust tube 60.

While various embodiments of the present disclosure have been particularly shown and described, it will be understood by those skilled in the art that various changes in form and details may be made therein without departing from the spirit and scope of the present disclosure as defined by the appended claims.

For example, the noise cancelling apparatus 26 was described above as attenuating noise from engine exhaust 30 from a vehicle engine 24. It should be understood that the noise cancelling apparatus 26 is able to attenuate noise in other situations as well such as non-vehicle applications. Along these lines, in other arrangements, the noise cancelling apparatus 26 attenuates noise in the airflow of duct work (e.g., an HVAC system), a standard air passage, a wind tunnel, large generator installations, and so on. Such modifications and enhancements are intended to belong to various embodiments of the disclosure.

What is claimed is:

1. Apparatus to attenuate noise from engine exhaust from an engine, the apparatus comprising:
   a first tube having an input end which receives the engine exhaust from the engine, and an output end which outputs the engine exhaust;
   a second tube which encircles the output end of the first tube, the second tube having an exhaust end through which the engine exhaust outputted by the output end of the first tube is allowed to escape, and a resonator end which is opposite the exhaust end; and
   a reverse resonator disposed at the resonator end of the second tube, the reverse resonator defining a reverse resonator chamber and a reverse resonator chamber diameter which is larger than a second tube diameter defined by the second tube, the reverse resonator being constructed and arranged to operate in an active manner to attenuate the noise from the engine exhaust and including:
      a speaker to generate an anti-noise signal to cancel the noise from the engine exhaust, and
      a fan to provide airflow in a direction from the resonator end of the second tube to the exhaust end of the second tube.

2. Apparatus as in claim 1 wherein the reverse resonator, the output end of the first tube, and the exhaust end of the second tube are arranged in an inline configuration to provide uniform attenuation of the noise from the engine exhaust as the engine exhaust is outputted by the output end of the first tube.

3. Apparatus as in claim 2 wherein the output end of the first tube defines a first tube diameter, the first tube diameter being smaller than the second tube diameter, and being smaller than the reverse resonator chamber diameter.

4. Apparatus as in claim 2 wherein the output end of the first tube and a portion of the first tube adjacent the output end defines a first tube center axis;
   wherein the exhaust end and the resonator end of the second tube define a second tube center axis which is coaxial with the first tube center axis; and
   wherein the reverse resonator further defines a reverse resonator chamber center axis which is coaxial with the first tube center axis and the second tube center axis.

5. Apparatus as in claim 4 wherein the speaker of the reverse resonator includes:
   a diaphragm having a center which is coaxial with (i) the output end of the first tube, (ii) the exhaust end and the resonator end of the second tube, and (iii) the reverse resonator chamber.

6. Apparatus as in claim 5 wherein the diaphragm of the speaker of the reverse resonator is disposed between the fan of the reverse resonator and the resonator end of the second tube; and
   wherein the diaphragm of the speaker of the reverse resonator defines a set of apertures which permits the airflow provided by the fan to flow from the fan to the resonator end of the second tube.

7. Apparatus as in claim 6, further comprising:
   an engine exhaust flow sensor which is constructed and arranged to measure a flow velocity of the engine exhaust, and
   digital signal processing (DSP) circuitry coupled to the engine exhaust flow sensor and to the speaker, the DSP circuitry being constructed and arranged to provide, based on an engine exhaust flow sensor signal from the engine exhaust flow sensor, an electronic speaker signal to the speaker to embed an acoustic anti-noise signal into the airflow provided by the fan to induce a noise cancellation effect as the airflow provided by the fan mixes with the engine exhaust outputted by the output end of the first tube.

8. Apparatus as in claim 7, further comprising:
   a mixing volume sensor physically coupled to the second tube and electrically coupled to the DSP circuitry to provide an electronic feedback signal to the DSP circuitry to enable the DSP circuitry to generate the electronic speaker signal based on (i) the electronic feedback signal and (ii) the engine exhaust flow sensor signal.

9. Apparatus as in claim 7 further comprising:
   a fan controller coupled to the engine exhaust flow sensor and to the fan, the fan controller being constructed and arranged to set a flow velocity of the airflow provided by the fan to optimize the noise cancellation effect.

10. Apparatus as in claim 1, further comprising:
    insulation to impede heat transfer from the engine and from the second tube toward the speaker.

11. Apparatus as in claim 1 wherein the diaphragm of the speaker includes an insulating membrane to prevent the speaker from sustaining heat damage.

12. Apparatus as in claim 2, further comprising:
a reducer coupled to the exhaust end of the second tube, the reducer defining a funnel-shaped pathway to reduce air backflow around the output end of the first tube.

13. A vehicle, comprising:
a vehicle frame;
an engine coupled to the vehicle frame, the engine being constructed and arranged to provide propulsion to the vehicle frame; and
a noise canceling apparatus coupled to the vehicle frame, the noise canceling apparatus being constructed and arranged to attenuate noise from engine exhaust from the engine, the apparatus including:
 a first tube having an input end which receives the engine exhaust from the engine, and an output end which outputs the engine exhaust,
 a second tube which encircles the output end of the first tube, the second tube having an exhaust end through which the engine exhaust outputted by the output end of the first tube is allowed to escape, and a resonator end which is opposite the exhaust end, and
 a reverse resonator disposed at the resonator end of the second tube, the reverse resonator defining a reverse resonator chamber and a reverse resonator chamber diameter which is larger than a second tube diameter defined by the second tube, the reverse resonator being constructed and arranged to operate in an active manner to attenuate the noise from the engine exhaust and including:
  a speaker to generate an anti-noise signal to cancel the noise from the engine exhaust, and
  a fan to provide airflow in a direction from the resonator end of the second tube to the exhaust end of the second tube.

14. A vehicle as in claim 13 wherein the reverse resonator, the output end of the first tube, and the exhaust end of the second tube are arranged in an inline configuration to provide uniform attenuation of the noise from the engine exhaust as the engine exhaust is outputted by the output end of the first tube.

15. A method of attenuating noise from engine exhaust from an engine, the method comprising:
connecting a noise canceling apparatus to the engine, the noise canceling apparatus including:
 a first tube having an input end which receives the engine exhaust from the engine, and an output end which outputs the engine exhaust;
 a second tube which encircles the output end of the first tube, the second tube having an exhaust end through which the engine exhaust outputted by the output end of the first tube is allowed to escape, and a resonator end which is opposite the exhaust end; and
 a reverse resonator disposed at the resonator end of the second tube, the reverse resonator defining a reverse resonator chamber and a reverse resonator chamber diameter which is larger than a second tube diameter defined by the second tube, the reverse resonator having a speaker and a fan;
operating the engine, the engine exhaust from the engine being provided to the input end of the first tube in response to operation of the engine;
operating the speaker to generate an acoustic anti-noise signal in an airflow in a direction from the resonator end of the second tube to the exhaust end of the second tube to uniformly attenuate the noise from the engine exhaust as the engine exhaust is outputted by the output end of the first tube, and
operating the fan to provide airflow in a direction from the resonator end of the second tube to the exhaust end of the second tube.

16. A vehicle as in claim 14 wherein the output end of the first tube and a portion of the first tube adjacent the output end defines a first tube center axis;
wherein the exhaust end and the resonator end of the second tube define a second tube center axis which is coaxial with the first tube center axis; and
wherein the reverse resonator further defines a reverse resonator chamber center axis which is coaxial with the first tube center axis and the second tube center axis.

17. A vehicle as in claim 16 wherein the speaker of the reverse resonator includes:
a diaphragm having a center which is coaxial with (i) the output end of the first tube, (ii) the exhaust end and the resonator end of the second tube, and (iii) the reverse resonator chamber.

18. A vehicle as in claim 17 wherein the diaphragm of the speaker of the reverse resonator is disposed between the fan of the reverse resonator and the resonator end of the second tube; and
wherein the diaphragm of the speaker of the reverse resonator defines a set of apertures which permits the airflow provided by the fan to flow from the fan to the resonator end of the second tube.

19. A vehicle as in claim 18 further comprising:
an engine exhaust flow sensor which is constructed and arranged to measure a flow velocity of the engine exhaust, and
digital signal processing (DSP) circuitry coupled to the engine exhaust flow sensor and to the speaker, the DSP circuitry being constructed and arranged to provide, based on an engine exhaust flow sensor signal from the engine exhaust flow sensor, an electronic speaker signal to the speaker to embed an acoustic anti-noise signal into the airflow provided by the fan to induce a noise cancellation effect as the airflow provided by the fan mixes with the engine exhaust outputted by the output end of the first tube.

20. A vehicle as in claim 19 further comprising:
a fan controller coupled to the engine exhaust flow sensor and to the fan, the fan controller being constructed and arranged to set a flow velocity of the airflow provided by the fan to optimize the noise cancellation effect.

\* \* \* \* \*